(12) United States Patent
Zhang et al.

(10) Patent No.: US 11,189,821 B2
(45) Date of Patent: Nov. 30, 2021

(54) ELECTROCHEMICAL DEVICE

(71) Applicant: Contemporary Amperex Technology Co., Limited, Ningde (CN)

(72) Inventors: Xiaowen Zhang, Ningde (CN); Zhenhua Li, Ningde (CN); Haizu Jin, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 16/971,118

(22) PCT Filed: Nov. 15, 2019

(86) PCT No.: PCT/CN2019/118828
§ 371 (c)(1),
(2) Date: Aug. 19, 2020

(87) PCT Pub. No.: WO2020/098789
PCT Pub. Date: May 22, 2020

(65) Prior Publication Data
US 2021/0098774 A1    Apr. 1, 2021

(30) Foreign Application Priority Data

Nov. 16, 2018 (CN) .......................... 201811367022.6

(51) Int. Cl.
*H01M 4/131* (2010.01)
*H01M 4/133* (2010.01)
(Continued)

(52) U.S. Cl.
CPC .......... *H01M 4/131* (2013.01); *H01M 4/133* (2013.01); *H01M 4/134* (2013.01); *H01M 4/137* (2013.01);
(Continued)

(58) Field of Classification Search
CPC .......... H01M 10/052; H01M 10/0525; H01M 10/0568; H01M 10/4235;
(Continued)

(56) References Cited

U.S. PATENT DOCUMENTS

| 6,150,051 A | 11/2000 | Du Pasquier et al. |
| 2006/0099495 A1 | 5/2006 | Suzuki et al. |
| 2013/0147439 A1 | 6/2013 | Takahashi |

FOREIGN PATENT DOCUMENTS

| CN | 1585157 A | 2/2005 |
| CN | 101436655 A | 5/2009 |

(Continued)

OTHER PUBLICATIONS

E. R. Logan, E. M. Tonita, K. L. Gering, L. Ma, M. K. G. Bauer, J. Li, L. Y. Beaulieu, J. R. Dahn. A Study of the Transport Properties of Ethylene Carbonate-Free Li Electrolytes, Journal of the Electrochemical Society, 165 (3) A705-A716 (2018).*

(Continued)

*Primary Examiner* — Carlos Barcena
(74) *Attorney, Agent, or Firm* — Law Offices of Liaoteng Wang (57) ABSTRACT

This application relates to an electrochemical device. The electrochemical device comprises a positive electrode plate, a negative electrode plate and an electrolyte, wherein the positive electrode plate comprises a current collector, a positive electrode active material layer and a safety coating disposed between the current collector and the positive electrode active material layer; the safety coating comprises a polymer matrix, a conductive material and an inorganic filler; wherein based on the total weight of the polymer matrix, the conductive material and the inorganic filler, the polymer matrix is present in a content of from 35 wt % to 75 wt %, the conductive material is present in a content of from 5 wt % to 25 wt %, and the inorganic filler is present (Continued)

in a content of from 10 wt % to 60 wt %; and the electrolyte has a viscosity at normal temperature of ≤4 cp.

20 Claims, 4 Drawing Sheets (51) Int. Cl.
  H01M 4/134 (2010.01)
  H01M 4/137 (2010.01)
  H01M 4/36 (2006.01)
  H01M 4/62 (2006.01)
  H01M 4/66 (2006.01)
  H01M 10/0525 (2010.01)
  H01M 4/02 (2006.01)
(52) U.S. Cl.
  CPC ........... *H01M 4/366* (2013.01); *H01M 4/623* (2013.01); *H01M 4/625* (2013.01); *H01M 4/626* (2013.01); *H01M 4/661* (2013.01); *H01M 10/0525* (2013.01); *H01M 2004/027* (2013.01); *H01M 2004/028* (2013.01); *H01M 2220/20* (2013.01)
(58) Field of Classification Search
  CPC ..... H01M 2004/027; H01M 2004/028; H01M 2220/20; H01M 2300/0025; H01M 4/131; H01M 4/133; H01M 4/134; H01M 4/137; H01M 4/366; H01M 4/525; H01M 4/5825; H01M 4/622; H01M 4/623; H01M 4/625; H01M 4/626; H01M 4/661; H01M 4/80
  See application file for complete search history.

(56) References Cited

FOREIGN PATENT DOCUMENTS

| | | | |
|---|---|---|---|
| CN | 101471435 A | 7/2009 | |
| CN | 102176360 A | 9/2011 | |
| CN | 102344598 A | 2/2012 | |
| CN | 102959768 A | 3/2013 | |
| CN | 103078141 A | 5/2013 | |
| CN | 103165863 A * | 6/2013 | ............ H01M 4/136 |
| CN | 103259020 A | 8/2013 | |
| CN | 103904294 A | 7/2014 | |
| CN | 104377342 A | 2/2015 | |
| CN | 106450327 A | 2/2017 | |
| CN | 107004858 A | 8/2017 | |
| JP | 2018116810 A | 7/2018 | |

OTHER PUBLICATIONS

PCT International Search Report for PCT/CN2019/118828 dated Feb. 17, 2020, 16 pages.
The First Office Action and search report dated Aug. 27, 2020 for Chinese Application No. 201811367022.6, 12 pages.
The Second Office Action and search report dated Nov. 11, 2020 for Chinese Application No. 201811367022.6, 11 pages.
The Third Office Action and search report dated Feb. 10, 2021 for Chinese Application No. 201811367022.6, 10 pages.
The extended European search report for European Application No. 19883889.8 dated Mar. 26, 2021, 5 pages.

* cited by examiner

ELECTROCHEMICAL DEVICE

CROSS-REFERENCE TO RELATED APPLICATION

This application is a National Stage of International Application No. PCT/CN2019/118828, filed on Nov. 15, 2019, which claims priority to Chinese Patent Application No. 201811367022.6 filed on Nov. 16, 2018, both of which are hereby incorporated by reference in their entireties.

TECHNICAL FIELD

This application relates to the technical field of electrochemical technology, and more particularly relates to an electrochemical device, especially a battery.

BACKGROUND

Lithium ion batteries are widely used in electric vehicles and consumer electronics because of their high energy density, high output power, long cycle life and small environmental pollution. However, lithium ion batteries are prone to fire and explode when subjected to abnormal conditions such as crushing, bumping or puncture, causing serious harm. Therefore, the safety problem of lithium ion batteries greatly limits the application and popularity of lithium ion batteries.

SUMMARY

It is an object of this application to provide an electrochemical device with improved safety and electrical performances.

It is a further object of this application to provide an electrochemical device with good safety performance (especially nail penetration safety) and improved electrical performance (especially cycle performance).

The present application provides an electrochemical device comprising a positive electrode plate, a negative electrode plate and an electrolyte, wherein the positive electrode plate comprises a current collector, a positive electrode active material layer and a safety coating disposed between the current collector and the positive electrode active material layer; the safety coating comprises a polymer matrix, a conductive material and an inorganic filler; and based on the total weight of the polymer matrix, the conductive material and the inorganic filler, the polymer matrix is present in a content of from 35 wt % to 75 wt %, the conductive material is present in a content of from 5 wt % to 25 wt %, and the inorganic filler is present in a content of from 10 wt % to 60 wt %; the inorganic filler is an electrochemically active material or a conductive carbon coating modified electrochemically active material, a conductive metal coating modified electrochemically active material, or a conductive polymer coating modified electrochemically active material; and the electrolyte has a viscosity at normal temperature of ≤4 cp.

DESCRIPTION OF THE DRAWINGS

The electrochemical device and the beneficial effects of this application will be described in details below with reference to the accompanying drawings and specific embodiments.

Among them, the reference numerals are defined as follows:
1 battery pack
  2 upper cabinet body
  3 lower cabinet body
  4 battery module
    5 battery
      51 case
      52 electrode assembly
      53 top cover assembly.

DETAILED DESCRIPTION

Upon studying the related solutions, the inventors have found that, a large number of experimental results show that internal short circuit of lithium ion battery is the basic cause of the battery's safety hazard. In order to avoid the internal short-circuit of the battery, researchers have tried to improve the battery in many ways, including the use of PTC materials to improve the safety performance of lithium ion battery. A PTC (Positive Temperature Coefficient) material is a positive temperature coefficient heat sensitive material, which has the characteristic that its resistivity increases with increasing temperature. When the temperature exceeds a certain temperature, the resistivity of the PTC material increases rapidly stepwise.

The inventors have found that, in the studies of utilizing the characteristics of PTC materials to improve the safety performance of lithium ion battery, some studies involve addition of PTC materials to the electrode active material layer of the battery. When the temperature of the battery rises, the resistance of the PTC material increases, thereby causing the resistance of the entire electrode active material layer to become large, and even destroying the conductive path of the entire electrode active material layer. Thus the security effect is achieved by causing power interruption and preventing the electrochemical reaction from proceeding. However, with this modification, the PTC material added in the electrode active material layer adversely affects the electrochemical performance of the battery.

The inventors have found that, still other studies have provided a separate layer of PTC material (safety coating) between the metal current collector and the electrode active material layer of the battery. When the temperature of the battery rises, the resistance of the PTC material layer increases, so that the electric resistance between the metal current collector and the electrode active material layer is increased or even power supply is interrupted, thereby achieving the security effect of preventing the electrochemical reaction from proceeding. However, with this modification, when the active material slurry is coated on the surface of the PTC material layer, the solvent (such as NMP) in the slurry would dissolve the PTC material of the PTC layer and thus the dissolved PTC material enters the upper active material layer, which not only destroys the PCT effect of the PTC layer and also deteriorates its electrical properties. In addition, in the compacting step of the plate fabrication process, the PTC material layer is easily squeezed to the edge and thus the electrode active material layer would directly contact the metal current collector, so that the PTC material layer cannot improve the safety performance. In addition, it is required to greatly improve the performance of the PTC material layer, such as the response speed, the effect of blocking current, and the like.

In view of this, it is indeed necessary to provide a battery that has an improved safety performance and is capable of solving the above problems.

The present application describes an electrochemical device, comprising a positive electrode plate, a negative electrode plate and an electrolyte, wherein the positive electrode plate comprises a current collector, a positive electrode active material layer and a safety coating disposed between the current collector and the positive electrode active material layer; the safety coating comprises a polymer matrix, a conductive material and an inorganic filler; and based on the total weight of the polymer matrix, the conductive material and the inorganic filler, the polymer matrix is present in a content of from 35 wt % to 75 wt %, the conductive material is present in a content of from 5 wt % to 25 wt %, and the inorganic filler is present in a content of from 10 wt % to 60 wt %; the inorganic filler is an electrochemically active material or a conductive carbon coating modified electrochemically active material, a conductive metal coating modified electrochemically active material, or a conductive polymer coating modified electrochemically active material; and the electrolyte has a viscosity of ≤4 cp at 25±0.1° C.

The inventors have found that the addition of inorganic fillers to the safety coating is favorable to overcome the various problems faced by prior PCT safety coatings.

It has been found that in the case that when the safety coating does not contain an inorganic filler, the solvent (such as NMP or the like) in the positive electrode active material layer over the safety coating or the electrolyte will adversely dissolve and swell the polymer material in the safety coating, thus the safety coating will be damaged which will affect its PTC effect. The inventors have found that after adding an inorganic filler to the safety coating, the inorganic filler as a barrier can advantageously eliminate the above-mentioned adverse effects such as dissolving and swelling, and thus it is advantageous for stabilizing the safety coating. In addition, it has also been found that the addition of the inorganic filler is also advantageous for ensuring that the safety coating is not easily deformed when the electrode plate is compacted. Therefore, the addition of the inorganic filler can well ensure that the safety coating is stably disposed between the metal current collector and the positive electrode active material layer and that the metal current collector is prevented from directly contacting with the positive electrode active material layer, thereby improving safety performance of the battery.

Surprisingly, the inventors have also found that inorganic fillers can also improve the performance such as the response speed of the safety coating. The safety coating works as below. At normal temperature, the safety coating relies on a good conductive network formed between the conductive materials to conduct electron conduction. When the temperature rises, the volume of the polymer matrix material begins to expand, the spacing between the particles of the conductive materials increases, and the conductive network is partially blocked, so that the resistance of the safety coating increases gradually. When a certain temperature (for example the operating temperature) is reached, the conductive network is almost completely blocked, and the current approaches zero. However, usually when the inside of the safety coating reaches a dynamic balance, the conductive network will be partially recovered. Therefore, after reaching a certain temperature (for example the operating temperature), the resistance of the safety coating is not as large as expected, and still there is very little current flowing through. The inventors have found that after the inorganic filler is added and the volume of the polymer matrix material expands, both of the inorganic filler and the expanded polymer matrix material can function to block the conductive network. Therefore, after the addition of the inorganic filler, the safety coating can better produce PTC effect in the operating temperature range. That is to say, the increasing speed of resistance is faster and the PTC response speed is faster at a high temperature. As a result, the safety performance of battery can be improved better.

The inorganic filler may be selected from at least one of a metal oxide, a non-metal oxide, a metal carbide, a non-metal carbide, and an inorganic salt, or at least one of a conductive carbon coating modified above material, a conductive metal coating modified above material or a conductive polymer coating modified above material.

The inventors have further found that in the case that the safety coating is used in the positive electrode plate, it is particularly advantageous when an electrochemically active material or a conductive carbon coating modified electrochemically active material, a conductive metal coating modified electrochemically active material or a conductive polymer coating modified electrochemically active material is used as the inorganic filler. In such a case, in addition to above mentioned functions as stabilizing the safety coating (hindering organic solvent from adverse effects such as dissolving or swelling the polymer material and ensuring that the safety coating is not easily deformed), and as improving the performance such as the response speed and the like of the safety coating, the inorganic filler may further play the following two roles:

(1) to improve the overcharge performance of the battery. In the PTC safety coating system composed of a fluorinated polyolefin and/or chlorinated polyolefin polymer matrix and a conductive material, since the electrochemically active material has the characteristics of lithium ion intercalation and de-intercalation, the electrochemically active material can be used as an "active site" in the conductive network at the normal operating temperature of the battery and thus the number of "active site" in the safety coating is increased. In the process of overcharging, the electrochemically active material will de-intercalate, and the de-intercalation has become more and more difficult, and the impedance is increasing. Therefore, when the current passes, the heat-generating power increases, and the temperature of the primer layer increases faster, so the PTC effect responds faster, which in turn can generate PTC effects before the overcharge safety problem in battery. Thus the overcharge safety performance of the battery may be improved.

(2) to contribute to capacity of charge and discharge. Since the electrochemically active material can contribute to a certain capacity of charge and discharge at the normal operating temperature of the battery, the effect of the safety coating on the electrochemical performance such as capacity of the battery at the normal operating temperature can be minimized.

Therefore, for the positive electrode plate, it is the most preferred to use an electrochemically active material or a conductive carbon coating modified electrochemically active material, a conductive metal coating modified electrochemically active material or a conductive polymer coating modified electrochemically active material as the inorganic filler of the safety coating.

As the inorganic filler of the safety coating, it is preferably selected from at least one of lithium cobalt oxide, lithium nickel manganese cobalt oxide, lithium nickel manganese aluminate, lithium iron phosphate, lithium vanadium phosphate, lithium cobalt phosphate, lithium manganese phosphate, lithium manganese iron phosphate, lithium iron silicate, lithium vanadium silicate, lithium cobalt silicate, lithium manganese silicate, spinel lithium manganese oxide, spinel lithium nickel manganese oxide, and lithium titanate, or their conductive carbon coating modified materials, their conductive metal coating modified materials, their conductive polymer coating modified materials. Especially, it is a conductive carbon coating modified electrochemically active material, such as a conductive carbon coating modified lithium cobalt oxide, a conductive carbon coating modified lithium nickel manganese cobalt oxide, a conductive carbon coating modified lithium nickel manganese aluminate, a conductive carbon coating modified lithium iron phosphate, a conductive carbon coating modified lithium vanadium phosphate, a conductive carbon coating modified lithium cobalt phosphate, a conductive carbon coating modified lithium manganese phosphate, a conductive carbon coating modified lithium manganese iron phosphate, a conductive carbon coating modified lithium iron silicate, a conductive carbon coating modified lithium vanadium silicate, a conductive carbon coating modified lithium cobalt silicate, a conductive carbon coating modified lithium manganese silicate, a conductive carbon coating modified spinel lithium manganese oxide, a conductive carbon coating modified spinel lithium nickel manganese oxide, a conductive carbon coating modified lithium titanate. These electrochemically active materials and conductive carbon coating modified electrochemically active materials are commonly used materials in the manufacture of lithium batteries, most of which are commercially available. The type of conductive carbon may be graphite, graphene, conductive carbon black, carbon nanotubes or the like. Further, the conductivity of the inorganic filler can be adjusted by adjusting the content of the conductive carbon coating.

In a safety coating of the positive electrode plate in the electrochemical device of the present application, based on the total weight of the polymer matrix, the conductive material and the inorganic filler, a content of the inorganic filler is from 10 wt % to 60 wt %. If the content is too small, it is not enough to stabilize the safety coating; if the content is too large, it will affect the PTC performance. The content of the inorganic filler in the safety coating is preferably from 15 wt % to 45 wt %.

When the particle size of the first positive electrode active material is too small, the specific surface area increases, and the side reaction increases; when the particle size is too large, the coating thickness of the safety coating is too large and the thickness is uneven. Preferably, the average particle size D of the inorganic filler in the safety coating satisfies 100 nm≤D≤10 μm, and more preferably 1 μm≤D≤6 μm. When the particle size of the inorganic filler is in the above ranges, the effect of blocking the conductive network at a high temperature can be improved, thereby improving the response speed of the safety coating. Further preferably, the inorganic filler in the safety coating has a specific surface area (BET) of not more than 500 m$^2$/g. When the specific surface area of the inorganic filler increases, side reaction will increase and thus the battery performance will be affected. Moreover, in the case that the specific surface area of the inorganic filler is too large, a higher proportion of binder will be consumed, which will cause the binding force among the safety coating, the current collector and the electrode active material layer to be reduced and the growth rate of the internal resistance to be high. When the specific surface area (BET) of the inorganic filler is not more than 500 m$^2$/g, a better overall effect can be provided.

Polymer Matrix Material

In addition to the inorganic filler, the positive PTC safety coating in the electrochemical device of the present application also comprises a polymer matrix material (PTC matrix material), and a conductive material.

The safety coating works as below. At a normal temperature, the safety coating relies on a good conductive network formed between the conductive materials to conduct electron conduction. When the temperature rises, the volume of the polymer matrix material begins to expand, the spacing between the particles of the conductive materials increases, and thus the conductive network is partially blocked, so that the resistance of the safety coating increases gradually. When a certain temperature (for example the operating temperature) is reached, the conductive network is almost completely blocked, and the current approaches zero, thereby protecting the electrochemical device that uses the safety coating.

Based on the total weight of the polymer matrix, the conductive material, and the inorganic filler, a content of the polymer matrix is from 35 wt % to 75 wt %, preferably from 40 wt % to 75 wt %, more preferably from 50 wt % to 75 wt %.

In the safety coating, the polymer matrix material may be a polyolefin material or other polymer materials such as polyethylene, polypropylene, ethylene-vinyl acetate copolymer (EVA), ethylene-acrylic acid copolymer, ethylene-methacrylic acid copolymer, polyamide, polystyrene, polyacrylonitrile, thermoplastic elastomer, epoxy resin, polyacetal, thermoplastic modified cellulose, polysulfone, polymethyl(meth) acrylate, a copolymer containing (meth) acrylate and the like. In addition, preferably, the safety coating may also contain a binder that promotes binding force between the polymer matrix material and the current collector. The binder may be for example PVDF, PVDC, SBR and the like, and also may be an aqueous binder selected from the group consisting of CMC, polyacrylate, polycarbonate, polyethylene oxide, rubber, polyurethane, sodium carboxymethyl cellulose, polyacrylic acid, acrylonitrile multicomponent copolymer, gelatin, chitosan, sodium alginate, a coupling agent, cyanoacrylate, a polymeric cyclic ether derivative, a hydroxy derivative of cyclodextrin, and the like.

In the conventional coating having PTC effect for being used in batteries, polyethylene, polypropylene or ethylene propylene copolymer or the like is generally used as the PTC matrix material. As described above, in this case, it is necessary to additionally add a binder to the PTC matrix material and the conductive material. If the binder content is too small, the binding force between the coating and the metal current collector is poor; and if the binder content is too large, the response temperature and response speed of the PTC effect are affected. The inventors have found that instead of using a conventional PTC matrix material such as polyethylene, polypropylene or ethylene propylene copolymer, a large amount of fluorinated polyolefin and/or chlorinated polyolefin is used between the metal current collector and the positive electrode active material layer, and can still function as a PTC thermistor layer and help eliminate the problems faced by existing PTC safety coatings. Therefore, it is more preferable to use a fluorinated polyolefin and/or a chlorinated polyolefin as the polymer base material.

Fluorinated polyolefin and/or chlorinated polyolefin (such as PVDF) is conventionally used as a binder. When used as a binder, the content of PVDF is much less than the content of the matrix material. For example, the PVDF binder in conventional PTC coatings is typically present in a content of less than 15% or 10%, or even less, relative to the total weight of the coating. In the present application, the fluorinated polyolefin and/or chlorinated polyolefin is used as a polymer matrix material, in a content that is much higher than the content of the binder. For example, based on the total weight of the safety coating, the content of the fluorinated polyolefin and/or chlorinated polyolefin as the polymer matrix material is from 35 wt % to 75 wt %.

In the present safety coating, the fluorinated polyolefin and/or chlorinated polyolefin material actually functions both as a PTC matrix and as a binder, which avoids the influence on the adhesion of the coating, the response speed, and the response temperature of the PTC effect due to the difference between the binder and the PTC matrix material.

Firstly, the safety coating composed of fluorinated polyolefin and/or chlorinated polyolefin material and a conductive material can function as a PTC thermistor layer and its operating temperature range is suitably from 80° C. to 160° C. Thus the high temperature safety performance of the battery may be improved well.

Secondly, fluorinated polyolefin and/or chlorinated polyolefin as the polymer matrix material of the safety coating serves as both a PTC matrix and a binder, thereby facilitating the preparation of a thinner safety coating without affecting the adhesion of the safety coating.

In addition, the solvent (such as NMP or the like) or the electrolyte in the positive electrode active material layer over the safety coating may have an adverse effect such as dissolution, swelling and the like on the polymer material of the safety coating. For the safety coating containing PVDF in a conventional binder amount, the adhesion would be easily getting worse. For the safety coating containing relatively high amount of fluorinated polyolefin and/or chlorinated polyolefin, the above adverse effect is relatively low.

Therefore, as an improvement of one aspect of the present application, the polymer matrix is preferably fluorinated polyolefin and/or chlorinated polyolefin, i.e. polyvinylidene fluoride (PVDF), polyvinylidene chloride (PVDC), modified PVDF, and/or modified PVDC. For example, the polymer matrix may be selected from the group consisting of PVDF, carboxylic acid modified PVDF, acrylic acid modified PVDF, PVDF copolymer, PVDC, carboxylic acid modified PVDC, acrylic acid modified PVDC, PVDC copolymer or any mixture thereof.

In a preferred embodiment of the present application, based on the total weight of the safety coating, a content of the fluorinated polyolefin and/or chlorinated polyolefin polymer matrix is from 35 wt % to 75 wt %. If the content is too small, the polymer matrix cannot ensure the safety coating works well in terms of its PTC effect; and if the content is too high, it will affect the response speed and the like of the safety coating. The content of the fluorinated polyolefin and/or chlorinated polyolefin polymer matrix is preferably from 40 wt % to 75 wt %, more preferably from 50 wt % to 75 wt %.

When a fluorinated polyolefin and/or chlorinated polyolefin polymer matrix materials is used in the safety coating in the electrochemical device of the present application, these materials themselves have good adhesion and can be used as a binder, in addition to being used as a matrix material. Therefore, when such polymer matrix materials are used, the safety coating does not have to contain other additional binders, which can simplify the process and save costs. Therefore, in a preferred embodiment of the present application, the polymer matrix is fluorinated polyolefin and/or a chlorinated polyolefin, and the safety coating is substantially free of other binders than the matrix material (the phrase "substantially free" means ≤3%, ≤1%, or ≤0.5%).

In the safety coating of the positive electrode plate in the electrochemical device of the present application, based on the total weight of the polymer matrix, the conductive material, and the inorganic filler, the content of the fluorinated polyolefin and/or chlorinated polyolefin polymer matrix is from 35 wt % to 75 wt %. If the content is too small, the polymer matrix cannot ensure the safety coating works well in terms of its PTC effect; and if the content is too high, it will affect the response speed and the like of the safety coating. The content of the fluorinated polyolefin and/or chlorinated polyolefin polymer matrix is preferably from 40 wt % to 75 wt %, more preferably from 50 wt % to 75 wt %.

Although the introduction of the safety coating can greatly improve the nail penetration safety performance of the plate and the battery, the polymer matrix has a certain swelling rate in the electrolyte. Therefore, the introduction of the safety coating will increase the DCR (internal resistance) of battery, which is not conducive to the improvement of kinetic performance of a battery.

Therefore, as a further improvement of another aspect of the present application, the polymer matrix in the safety coating of the positive electrode plate is preferably subjected to crosslinking treatment. Said polymer matrix in the safety coating is a polymer matrix having a crosslinked structure, preferably fluorinated polyolefin and/or chlorinated polyolefin having a crosslinked structure.

Preferably, a weight ratio of the crosslinking agent used in the crosslinking treatment to the polymer matrix is from 0.01% to 5%.

The crosslinking treatment may be more advantageous for hindering the adverse effects of a solvent (such as NMP or the like) in the positive electrode active material layer or an electrolyte on the polymer material in the safety coating, such as dissolving or swelling and the like, and for preventing the positive electrode active material layer from cracking due to uneven stress.

In addition, the polymer matrix which is not subjected to crosslinking treatment has a large swelling in the electrolyte, causing a large DCR growth of battery, which is disadvantageous to improvement of the kinetic performance of battery. After being subjected to crosslinking treatment, the swelling ratio of the polymer matrix is effectively suppressed, so that the DCR growth due to introduction of the safety coating can be remarkably reduced.

The procedure of the crosslinking treatment is known in the art. For example, for fluorinated polyolefin and/or chlorinated polyolefin polymer matrix, the crosslinking treatment can be achieved by introducing an activator and a crosslinking agent. The function of the activator is to remove HF or HCl from fluorinated polyolefin and/or chlorinated polyolefin to form a C=C double bond; and the crosslinking agent acts to crosslink the C=C double bond. As an activator, a strong base-weak acid salt such as sodium silicate or potassium silicate can be used. A weight ratio of the activator to the polymer matrix is usually from 0.5% to 5%.

The crosslinking agent may be selected from at least one of polyisocyanates (JQ-1, JQ-1E, JQ-2E, JQ-3E, JQ-4, JQ-5, JQ-6, PAPI, emulsifiable MDI, tetraisocyanate), polyamines (propylenediamine, MOCA), polyols (polyethylene glycol, polypropylene glycol, trimethylolpropane), glycidyl ethers (polypropylene glycol glycidyl ether), inorganic substances (zinc oxide, aluminum chloride, aluminum sulfate, sulfur, boric acid, borax, chromium nitrate), glyoxal, aziridine, olefinically unsaturated compounds (styrene, α-methylstyrene, acrylonitrile, acrylic acid, methacrylic acid, acrylates (1,4-butylene glycol diacrylate, ethylene glycol dimethacrylate, TAC, butyl acrylate, HEA, HPA, HEMA, HPMA, MMA)), organosilicons (ethyl orthosilicate, methyl orthosilicate, trimethoxysilane), benzenesulfonic acids (p-toluenesulfonic acid, p-toluenesulfonyl chloride), organic peroxides (dicumyl peroxide, bis(2,4-dichlorobenzoyl) peroxide), and metal organic compounds (aluminum isopropoxide, zinc acetate, titanium acetylacetonate).

The weight ratio of the crosslinking agent to the polymer matrix is from 0.01% to 5%. If the content of crosslinking agent is small, the crosslinking degree of the polymer matrix is low, which cannot eliminate cracking completely. If the content of crosslinking agent is too high, it is easy to cause gel during stirring. The activator and the crosslinking agent may be added after the stirring step of the slurry for preparing the safety coating is completed. After carrying out the crosslinking reaction, the mixture is uniformly stirred and then coated to prepare a safety coating.

Conductive Material

The conductive material used in the safety coating may be selected from at least one of a conductive carbon-based material, a conductive metal material, and a conductive polymer material. As illustrative examples, the conductive carbon-based material may be selected from at least one of conductive carbon black, acetylene black, graphite, graphene, carbon nanotubes, carbon nanofibers; the conductive metal material is selected from at least one of Al powder, Ni powder, and gold powder; and the conductive polymer material may be selected from at least one of conductive polythiophene, conductive polypyrrole, and conductive polyaniline. The conductive material may be used alone or in combination of two or more.

In the present application, based on the total weight of the safety coating, a content of the conductive material is from 5 wt % to 25 wt %, preferably from 5 wt % to 20 wt %.

Conductive materials are typically used in the form of powders or granules. The particle size may be from 5 nm to 500 nm, for example, from 10 nm to 300 nm, from 15 nm to 200 nm, from 15 nm to 100 nm, from 20 nm to 400 nm, from 20 nm to 150 nm, or the like, depending on the specific application environment.

Preferably, a weight ratio of the polymer matrix material to the conductive material is 2 or more. With such ratio, the safety performance during nail penetration can be further improved. If the weight ratio of the polymer matrix material to the conductive material is less than 2, the content of the conductive material is relatively high, and the conductive network may not be sufficiently broken at elevated temperature, thereby affecting the PTC effect. If the weight ratio of the polymer matrix material to the conductive material is too high, the content of the conductive material is relatively low, which causes a large increase in the DCR of the battery at normal operation. Preferably, the weight ratio of the polymer matrix to the conductive material is 8 or less. In an embodiment of the present application, the weight ratio of the polymer matrix to the conductive material is 3 or more and 8 or less.

Safety Coating

The safety coating in the electrochemical device of the present application can be formed by a conventional method. For example, a desired safety coating may be obtained by dissolving a polymer matrix material, a conductive material, a inorganic filler and optionally a binder or other auxiliary agents in a solvent under stirring to form a slurry, applying the slurry onto the current collector followed by heating and drying.

In the positive electrode plate of the electrochemical device of the present application, the safety coating is directly adhered onto current collector and disposed between current collector and positive electrode active material layer. A thickness H of the safety coating can be reasonably determined according to actual needs. The thickness H of the safety coating is usually not more than 40 μm, preferably not more than 25 μm, more preferably not more than 20 μm, 15 μm or 10 μm. The thickness of the safety coating is usually greater than or equal to 1 μm, preferably greater than or equal to 2 μm, and more preferably greater than or equal to 3 μm. If the thickness is too small, it is not enough to ensure that the safety coating has the effect of improving safety performance of the battery; if it is too large, the internal resistance of the battery will increase seriously, which will affect electrochemical performance of the battery during normal operation. Preferably, 1 μm ≤H≤20 μm, more preferably 3 μm≤H≤10 μm.

A bonding force between the safety coating and the current collector is preferably greater than or equals to 10 N/m. For example, the bonding force between the safety coating and the current collector can be increased by introducing an additional binder or by crosslinking the polymer matrix. Too small bonding force will cause the safety coating to fall off easily, which will cause the battery DCR to increase greatly and adversely affect improvement of the safety performance of the battery.

In addition to the polymer matrix, the conductive material, and the inorganic filler, the safety coating may also contain other materials or components, such as other binders that promote adhesion between the coating and the substrate for the metal current collector. Those skilled in the art can select other auxiliaries according to actual needs.

In some preferred embodiments of the present application in which fluorinated polyolefin and/or chlorinated polyolefin is used in polymer matrix as the safety coating, since fluorinated polyolefin and/or chlorinated polyolefin has a good adhesion, the safety coating layer is substantially free of other binders than said polymer matrix (the phrase "substantially free" means ≤3%, ≤1%, or ≤0.5%).

Moreover, in some preferred embodiments of the present application, fluorinated polyolefin and/or chlorinated polyolefin is used as a polymer matrix in the safety coating, and the safety coating may consist substantially of the polymer matrix, the conductive material, and the inorganic filler, in other words, the safety coating is free of a significant amounts (e.g., ≤3%, ≤1%, or ≤0.5%) of other components.

Current Collector

For the current collector, the common materials in the art, preferably metal current collectors, such as metal flakes or metal foils of stainless steel, aluminum, copper, titanium or the like can be used. The current collector may have a thickness of from 4 μm to 16 μm. Preferably, the current collector is a porous current collector (for example, a porous aluminum foil). Use of a porous aluminum foil can reduce the probability of occurrence of the metal burrs and further reduce the probability of occurrence of a severe aluminothermic reaction in an abnormal situation such as nailing. Therefore, safety performance of the battery may be further improved. In addition, use of a porous aluminum foil can also improve infiltration of the electrolyte to the electrode plate, and thereby improve the kinetic performance of the lithium ion battery. The safety coating can cover the surface of the porous aluminum foil to prevent miss coating of the upper active material layer during the coating process.

Further, in consideration of the safety performance during nail penetration, an elongation at break δ of the current collector is preferably 0.8%≤δ≤4%. It was found that if the elongation at break of the current collector is too large, the metal burrs will be larger when puncturation, which is not conducive to improving safety performance of the battery. Conversely, if the elongation at break of the current collector is too small, breakage is likely to occur during processing such as plate compaction or when the battery is squeezed or collided, thereby degrading quality or safety performance of the battery. Therefore, in order to further improve safety performance, particularly safety performance during nail penetration, the elongation at break δ of the current collector should be not more than 4% and not less than 0.8%. The elongation at break of the metal current collector can be adjusted by changing purity, impurity content and additives of the metal current collector, the billet production process, the rolling speed, the heat treatment process, and the like.

Positive Electrode Active Material Layer

As the positive electrode active material layer used for the positive electrode plate in the electrochemical device of the present application, various conventional positive electrode active material layers known in the art can be used, and the constitution and preparation method thereof are well known in the art without any particular limitation. The positive electrode active material layer contains a positive electrode active material, and various positive electrode active materials for preparing a lithium ion secondary battery positive electrode known to those skilled in the art may be used. For example, the positive electrode active material is a lithium-containing composite metal oxide, for example one or more of $LiCoO_2$, $LiNiO_2$, $LiMn_2O_4$, $LiFePO_4$, lithium nickel cobalt manganese oxide (such as $LiNi_{0.5}Co_{0.2}Mn_{0.3}O_2$) and one or more of lithium nickel manganese oxide.

When the positive electrode electrochemically active material (or a coating modified material thereof) is used as the inorganic filler of the safety coating of the positive electrode plate, the positive electrode electrochemically active material in the safety coating and the positive active substance used in the positive electrode active material layer may be the same or different.

Due to the introduction of the safety coating, the DCR of the battery will be increased. Thus, in order to further improve the kinetic performance of battery, the positive electrode active material layer preferably comprises a carbon nanotube conductive agent; more preferably, it includes both a one-dimensional conductive agent and a zero-dimensional conductive agent, i.e., both a carbon nanotube conductive agent and a carbon black particle conductive agent.

Based on the total weight of the entire positive electrode active material layer, a content of the carbon nanotube is from 0.4 wt % to 1.0 wt %. If the content of carbon nanotube is too small, it is not enough to improve the kinetic performance of the battery; If the content is too high, it will cause the content of the positive electrode active material to be relatively small, and metal impurities may be easily introduced, which is not conducive to improving the cycle life of the battery.

Those skilled in the art will appreciate that various definitions or preferred ranges of the components, component amounts, and material physicochemical properties (particle size, specific surface area, elongation at break, etc.) in the various embodiments of the present application as mentioned above can be combined arbitrarily. The combined embodiments are still within the scope of the invention and are considered as part of the disclosure.

Positive Electrode Plate

Figure 1:
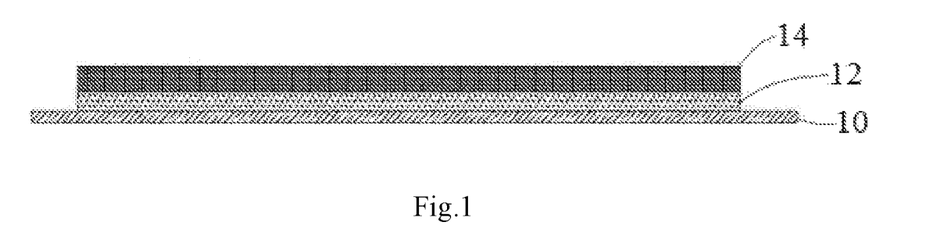
FIG. 1 is a schematic structural view of a positive electrode plate according to an embodiment of this application, in which 10—a metal current collector; 14—a positive electrode active material layer; 12—a safety coating (i.e. a PTC safety coating).

FIG. 1 shows a schematic structural view of a positive electrode plate in the electrochemical device according to some embodiments of this application, in which 10—a metal current collector; 14—a positive electrode active material layer; 12—a safety coating (i.e. a PTC safety coating). The specific compositions of the current collector, the active material layer, and the safety coating are described above.

It is easily understood that although the positive electrode active material layer is provided only on one side of the positive electrode metal current collector 10 as described in FIG. 1, in other embodiments, the safety coating 12 and the positive electrode active material layer 14 may be provided on both sides of the positive metal current collector 10, respectively.

Electrochemical Device

The electrochemical device in the present application comprises the above mentioned positive electrode plate, and may further comprise a negative electrode plate and an electrolyte. The electrochemical device may be a capacitor, a primary battery or a secondary battery. For example a lithium ion capacitor, a lithium ion primary battery or a lithium ion secondary battery can be used. The construction and preparation methods of these electrochemical devices are known per se.

The negative electrode plate for use in conjunction with the positive electrode plate in the electrochemical device of the present application may be selected from various conventional negative electrode plates in the art, and the constitution and preparation thereof are well known in the art. For example, the negative electrode plate may comprise a negative electrode current collector and a negative electrode active material layer disposed on the negative electrode current collector, and the negative electrode active material layer may comprise a negative electrode active material, a binder, a conductive material, and the like. The negative electrode active material is, for example, a carbonaceous material such as graphite (artificial graphite or natural graphite), conductive carbon black, carbon fiber, or the like; a metal or a semimetal material such as Si, Sn, Ge, Bi, Sn, In, or an alloy thereof; and a lithium-containing nitride or a lithium-containing oxide, a lithium metal or a lithium aluminum alloy.

The introduction of the safety coating will increase the DCR (internal resistance) of battery. Therefore, in order to further improve kinetic performance of a battery, the electrolyte used in the electrochemical device of the present application has a viscosity at normal temperature of not more than 4 cp.

The inventors have found that in the preferred embodiments in which an electrochemically active material (or a coating modified material thereof) is used as the inorganic filler, only after the safety coating being wetted or infiltrated by the electrolyte, the safety coating can better improve safety and improve the effect of overcharge. In order to improve infiltration of electrolyte, in these preferred embodiments, the electrolyte used in the electrochemical device has a viscosity at normal temperature of not more than 4 cp.

The electrolyte may be commonly used electrolytes in the art. Various electrolytes commonly used in the art, such as solutions of electrolytic lithium salt in non-aqueous solvents, may be used. The electrolytic lithium salt may be selected from one or more of lithium hexafluorophosphate (LiPF$_6$), lithium perchlorate, lithium tetrafluoroborate, lithium hexafluoroarsenate, lithium halide, lithium chloroaluminate, and lithium fluoroalkylsulfonate. The non-aqueous solvent may be selected from the group consisting of chain carbonates and cyclic carbonates. The chain carbonate may be at least one of dimethyl carbonate (DMC), diethyl carbonate (DEC), ethyl methyl carbonate (EMC), methyl propyl carbonate (MPC), dipropyl carbonate (DPC), and other chain-like organic esters containing fluorine, containing sulfur or having an unsaturated bond. The cyclic carbonate may be one or more of ethylene carbonate (EC), propylene carbonate (PC), vinylene carbonate (VC), γ-butyrolactone (γ-BL), sultone and other cyclic organic esters containing fluorine, containing sulfur or having an unsaturated bond.

Figure 2:
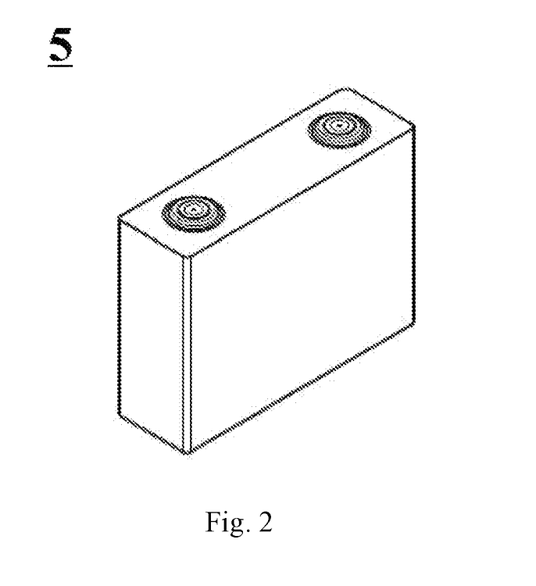
FIG. 2 is a perspective view of an embodiment of a lithium ion secondary battery.
Figure 3:
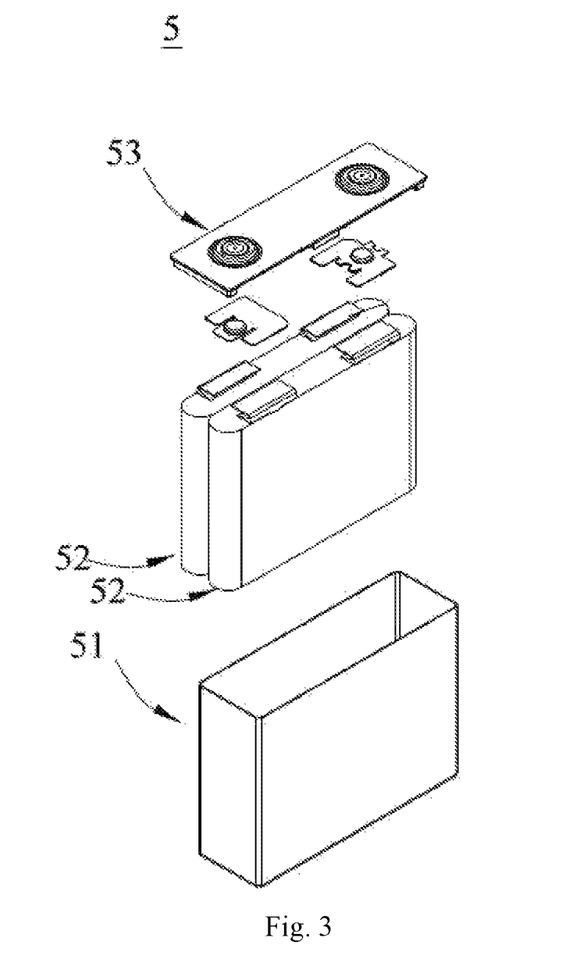
FIG. 3 is an exploded view of FIG. 2.

The electrochemical device of the present application can have improved safety (e.g., during nail penetration) and electrical performances. In a particular embodiment of the application, the electrochemical device is a lithium ion battery. FIG. 2 is a perspective view of an embodiment of a lithium ion battery 5. FIG. 3 is an exploded view of FIG. 2. Referring to FIG. 2 and FIG. 3, a lithium ion battery 5 includes a case 51, an electrode assembly 52, a top cover assembly 53, and an electrolyte (not shown).

The electrode assembly 52 is packed in the case 51. The number of electrode assembly 52 is not limited and may be one or more. The electrode assembly 52 includes a positive electrode plate, a negative electrode plate, and a separator. The separator separates the positive electrode plate from the negative electrode plate. The electrolyte is injected into the case 51 and impregnating the electrode assembly 52, which includes, for example, a first electrode plate, a second electrode plate and a separator.

Please be noted that the lithium ion battery 5 shown in FIG. 2 is a can-type battery, but is not limited thereto. The lithium ion battery 5 may be a pouch-type battery, i.e. the case 51 is replaced by a metal plastic film and the top cover assembly 53 is eliminated.

Next, a battery module of still another aspect of the present application will be described.

Figure 4:
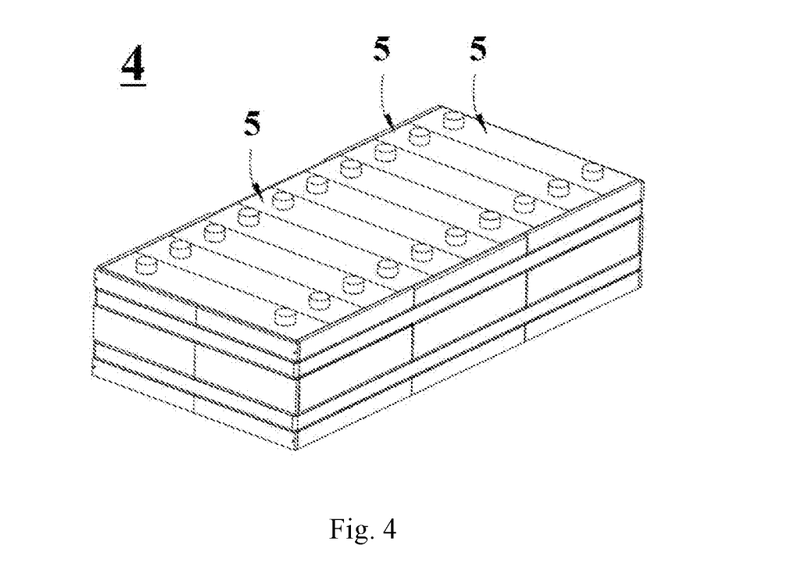
FIG. 4 is a perspective view of an embodiment of a battery module.

FIG. 4 is a perspective view of an embodiment of the battery module 4.

The battery module 4 provided by the embodiment of the present application includes the lithium ion battery 5 according to the present application.

Referring to FIG. 4, the battery module 4 includes a plurality of batteries 5. A plurality of lithium ion batteries 5 are arranged in the longitudinal direction. The battery module 4 can function as a power source or an energy storage device. The number of the lithium ion batteries 5 in the battery module 4 can be adjusted according to the application and capacity of the battery module 4.

Next, a battery pack of still another aspect of the present application will be described.

Figure 5:
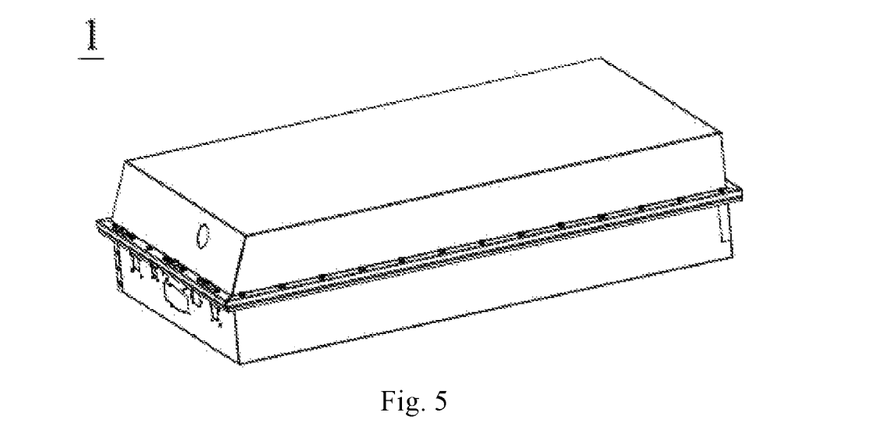
FIG. 5 is a perspective view of an embodiment of a battery pack.
Figure 6:
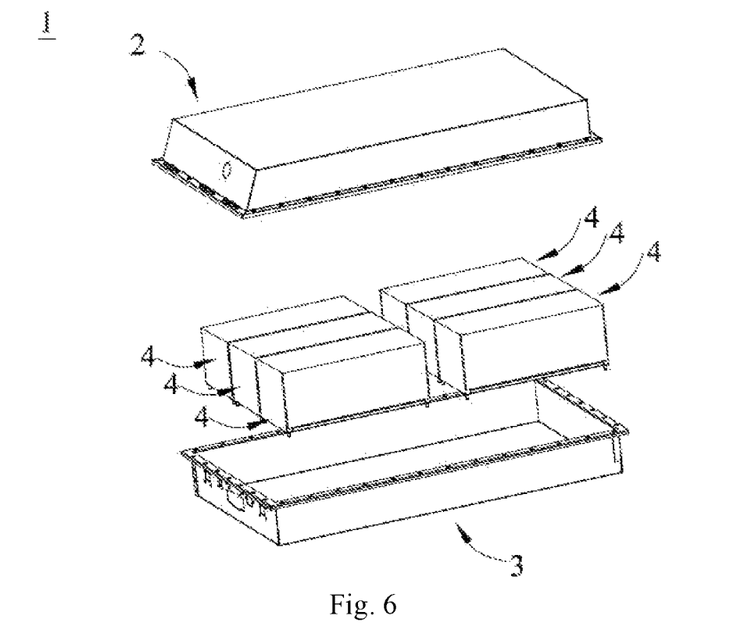
FIG. 6 is an exploded view of FIG. 5.

FIG. 5 is a perspective view of an embodiment of the battery pack 1. FIG. 6 is an exploded view of FIG. 5.

The battery pack 1 provided by the present application includes the battery module 4 according to an embodiment of the present application.

Specifically, referring to FIG. 5 and FIG. 6, the battery pack 1 includes an upper cabinet body 2, a lower cabinet body 3, and a battery module 4. The upper cabinet body 2 and the lower cabinet body 3 are assembled together and form a space in which the battery module 4 is packed. The battery module 4 is placed in the space of the upper cabinet body 2 and the lower cabinet body 3 which are assembled together. The output polar of the battery module 4 is passed between one or both of the upper cabinet body 2 and the lower cabinet body 3 to supply power to the outside or to be externally charged. The number and arrangement of the battery modules 4 used in the battery pack 1 can be determined according to actual needs.

Next, a device of still another aspect of the present application will be described.

Figure 7:
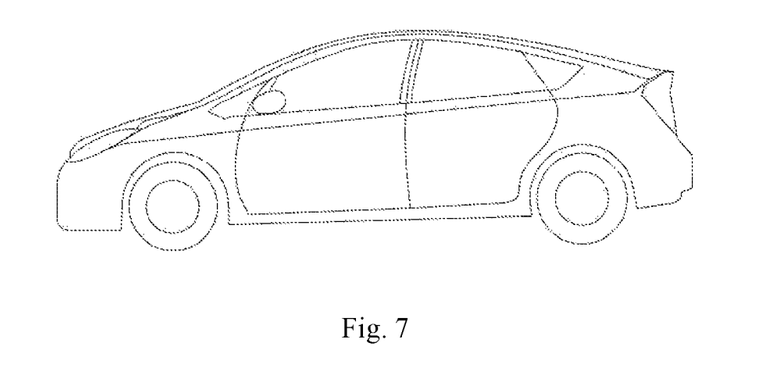
FIG. 7 is a schematic view showing an embodiment of a device wherein a lithium ion battery is used as a power source.

FIG. 7 is a schematic view showing an embodiment of a device wherein a lithium ion battery is used as a power source.

The device provided by the present application includes at least one of the battery 5, the battery module 4, or the battery pack 1. The lithium ion battery 5, the battery module 4, or the battery pack 1 can be used as a power source of the device. In FIG. 7, the device using the battery pack 1 is an electric car. Of course, it is not limited thereto, and the device using the battery 5, the battery module 4, or the battery pack 1 may be any electric vehicles (for example, an electric bus, an electric tram, an electric bicycle, an electric motorcycle, an electric scooter, an electric golf cart, an electric truck) other than the electric car, electric ships, electric tools, electronic equipment and energy storage systems. The electric vehicle can be a pure electric vehicle, a hybrid electric vehicle, or a plug-in hybrid electric vehicle.

EXAMPLE

In order to make the objects, the technical solutions and the beneficial technical effects of the present application more clear, the present application will be described in further detail below with reference to the embodiments. However, it is to be understood that embodiments of the present application are only intended to be illustrative of the present application, and are not intended to limit the application, and embodiments of the present application are not limited to those embodiments given in the specification. The experimental conditions not indicated in the examples may refer to conventional conditions, or the conditions recommended by the material supplier or equipment supplier.

1. Preparation Method 1.1 Preparation of Positive Electrode Plate

1) Safety Coating

Depending on whether or not the polymer matrix material in the safety coating is subjected to crosslinking treatment, the safety coating was prepared by one of the following two methods.

For the polymer matrix without cross-linking treatment:

A certain ratio of a polymer matrix material, a conductive material, and an inorganic filler were mixed with N-methyl-2-pyrrolidone (NMP) as a solvent with stirring uniformly, which was then coated on both sides of metal current collector, followed by drying at 85° C. to obtain a PTC layer, i.e. a safety coating.

For the polymer matrix with cross-linking treatment:

A certain ratio of a polymer matrix material, a conductive material, and an inorganic filler were mixed with N-methyl-2-pyrrolidone (NMP) as a solvent with stirring uniformly and then an activator (sodium silicate) and a crosslinking agent were added with stirring uniformly. The resulting mixture was then coated on both sides of metal current collector, followed by drying at 85° C. to obtain a PTC layer, i.e. a safety coating.

2) Positive Electrode Active Material Layer

Then, 90 wt % of a positive electrode active material, 5 wt % of SP, and 5 wt % of PVDF were mixed with NMP as a solvent with stirring uniformly, which was then coated on the safety coating of the current collector as prepared according to the above method followed by drying at 85° C. to obtain a positive electrode active material layer.

3) Work Up

Then, the current collector with two layers of positive electrode active material was cold-pressed, then trimmed, cut, and stripped, followed by drying under vacuum at 85° C. for 4 hours. After welding, the positive electrode plate meeting the requirements of the secondary battery was obtained.

The main materials used in the specific examples were as follows:

Polymer matrix: PVDF (Manufacturer "Solvay", model 5130), PVDC;

Crosslinking agent: acrylonitrile, tetraisocyanate, polyethylene glycol;

Conductive material (conductive agent): Super-P (TIMCAL, Switzerland, abbreviated as SP);

Inorganic filler: alumina, lithium iron phosphate (abbreviated as LFP), carbon coating modified lithium iron phosphate (abbreviated as LFP/C), carbon coating modified lithium titanate (abbreviated as $Li_4Ti_5O_{12}/C$);

Positive electrode active material: NCM811 ($LiNi_{0.8}Co_{0.1}Mn_{0.1}O_2$).

The above materials were commonly used materials in the lithium battery industry which may be commercially available from the corresponding suppliers.

1.2 Preparation of Negative Electrode Plate

Negative electrode plate was prepared as follows: active material graphite, conductive agent Super-P, thickener CMC, binder SBR were added to deionized water as a solvent at a mass ratio of 96.5:1.0:1.0:1.5 to form an anode slurry; then the slurry was coated on the surface of the negative electrode current collector in the form of copper foil, and dried at 85° C., then trimmed, cut, and stripped, followed by drying under vacuum at 110° C. for 4 hours. After welding, the negative electrode plate meeting the requirements of the secondary battery was obtained.

1.3 Preparation of Electrolyte

Ethylene carbonate (EC), ethyl methyl carbonate (EMC), and diethyl carbonate (DEC) were mixed at a weight ratio of 30:50:20 to obtain a mixed solvent of EC/EMC/DEC, followed by dissolving the fully dried lithium salt $LiPF_6$ into the mixed organic solvent at a concentration of 1 mol/L to prepare an electrolyte. This electrolyte (hereinafter referred to as "common electrolyte") has a viscosity at normal temperature, i.e. a viscosity at 25±0.1° C., of 3.5 cp.

1.4 Preparation of the Battery

A polypropylene film with a thickness of 12 μm was used as a separator, and the positive electrode, the separator and the negative electrode were stacked in order, so that the separator was sandwiched in between the positive electrode plate and the negative electrode plate, and then the stack was wound into a bare battery core. After vacuum baking at 75° C. for 10 h, the electrolyte (prepared as described in "Preparation of electrolyte" above) was injected therein followed by vacuum package and standing for 24 h. After that, the battery core was charged to 4.2 V with a constant current of 0.1 C, and then was charged with a constant voltage of 4.2 V until the current dropped to 0.05 C, and then was discharged to 3.0V with a constant current of 0.1 C. Above charging and discharging processes were repeated twice. Finally, the battery core was charged to 3.8V with a constant current of 0.1 C, thereby completing the preparation of the secondary battery.

2. Tests for Material Performances

In each of the examples and comparative examples, the physical property parameters of the materials were measured by a commonly known method in the art, unless otherwise specified.

Some specific parameters were tested using the following methods.

2.1 Particle Size

The power sample was dispersed in a dispersion medium (distilled water), which was measured with a Malvern laser particle size analyzer MS2000 for 5 times and averaged in unit of μm.

2.2 BET (Specific Surface Area)

The specific surface area of the powder sample of the test material was measured with a Quadrasorb SI specific surface tester for 5 times and averaged in unit of $m^2/g$.

2.3 the Bonding Force Between the Film Layer and the Current Collector

The electrode plate containing a current collector having a film layer on both sides was cut into a sample to be tested having a width of 2 cm and a length of 15 cm. One side of the sample to be tested was uniformly pasted on a stainless steel plate at 25° C. under normal pressure by using 3M double-sided tape. One end of the sample to be tested was fixed on a GOTECH tensile machine, and the film layer of the sample to be tested was stripped from the current collector by using the GOTECH tensile machine, wherein the maximum tensile force was read according to the data diagram of the tensile force and the displacement. The resulting value (in unit N) was divided by the thickness (0.02 m) of sample to calculate the bonding force (N/m).

2.4 Elongation at Break of Current Collector

Two samples having a length of 200 mm and a width of 15 mm were taken from the current collector. For each sample, the values of the thickness h (μm) of sample were measured by using a micrometer. The sample was then mounted on a tensile machine (model AI7000) and stretched at a speed of 50 mm/min. The average of the two tests was used as the test result. The initial length L0 was recorded. The tensile machine was started, until the sample broke. The displacement L1 of the sample at the time of the break was read from the tensile machine. Elongation at break=(L1−L0)/L0*100%.

2.5 Thickness of the Current Collector, Thickness of the Coating and Thickness of the Film Layer Thickness of the current collector was measured by a micrometer, and the average value of 5 points was used.

Thickness of the coating: first measure the thickness of the current collector, and then measure the total thickness after coating, and calculate the difference between the two values as the coating thickness. A similar method was used for the thickness of the film layer.

2.6 Cracking of the Coating

After drying and obtaining a positive electrode active material layer, if no cracks were observed in the 100 $m^2$ electrode plate, it was defined as no cracking; if the number of occurrences of cracks in 100 $m^2$ electrode plate was ≤3, it was defined as mild cracking; if the number of occurrences of cracks in 100 $m^2$ electrode plate was >3, it was defined as severe cracking.

2.7 Viscosity of Electrolyte

Viscosity was measured according to GB/T 10247-2008 at a temperature of 25° C.±0.1° C. by using a rotation method.

3. Tests for Battery Performance

The safety performances of the secondary batteries from various examples and comparative examples were evaluated using GBT31485-2015 "Safety Requirements and Test Methods for Traction Battery of Electric Vehicle", and the test results were recorded.

3.1 Puncture Test:

The secondary battery was fully charged to the charging cut-off voltage with a current of 1 C, and then charged with a constant voltage until the current dropped to 0.05 C. After that, charging was terminated. A high temperature resistant steel needle of φ5-10 mm (the tip thereof had a cone angle of 45°) was used to puncture the battery plate at a speed of 25 mm/s in the direction perpendicular to the battery plate. The puncture position should be close to the geometric center of the surface to be punctured, the steel needle stayed in the battery, and then observe if the battery had an indication of burning or exploding.

3.2 Overcharge Test:

The secondary battery was fully charged to the charging cut-off voltage with a current of 1 C, and then charged with a constant voltage until the current dropped to 0.05 C. After that, charging was terminated. Then, after charging with a constant current of 1 C to reach 1.5 times the charging cut-off voltage or after charging for 1 hour, the charging was terminated.

3.3 Cycle Performance Test:

The test conditions of the cycle number were as follows: the secondary battery was subjected to a 1 C/1 C cycle test at 25° C. in which the charging and discharging voltage range was 2.8 to 4.2 V. The test was terminated when the capacity was attenuated to 80% of the first discharging specific capacity.

3.4 PTC Effect Test

The secondary battery was fully charged to the charging cut-off voltage with a current of 1 C, and then charged with a constant voltage until the current was reduced to 0.05 C. After that, the charging was terminated and the DC resistance of the battery core was tested (discharging with a current of 4 C for 10 s). Then, the battery core was placed at 130° C. for 1 h followed by testing the DC resistance, and calculating the DC resistance growth rate. Then, the battery core was placed at 130° C. for 2 h followed by testing the DC resistance, and calculating the DC resistance growth rate.

3.5 DCR Test

The secondary battery was adjusted to 50% SOC with a current of 1 C at 25° C., and the voltage U1 was recorded. Then, it was discharged with a current of 4 C for 30 seconds, and the voltage U2 was recorded. DCR=(U1−U2)/4 C.

In this application, for convenience of comparison, the DCR of the battery core with uncrosslinked PVDF matrix was used as a reference, and was recorded as 100%, and the DCR of the other battery cores and the ratios thereof were calculated and recorded.

4. Performance Test Results 4.1 Protection Performance (PTC Effect) of Safety Coating and Effect Thereof on Battery Performance In order to confirm the protection performance of safety coating, the corresponding safety coating, positive electrode plate, negative electrode plate and battery were prepared with the specific materials and amounts listed in Table 1-1 below according to the methods and procedures described in "1. Preparation method", and were tested according to the method specified in "3. Tests for battery performance". In order to ensure accuracy of data, 4 samples were prepared for each battery (10 samples for the puncture test) and tested independently. The final test results were averaged and shown in Table 1-2.

In the test, the conventional electrode plate CPlate P was prepared with the method described in "1.1 Preparation of positive electrode plate", but the safety coating was not provided. That is to say, a positive electrode active material was directly applied over the current collector. The conventional electrode plate Cplate N was prepared according to the method described in "1.2 Preparation of negative electrode plate".

TABLE 1-1

Compositions of electrode plate

| | | | Composition of the safety coating | | | | | | |
|---|---|---|---|---|---|---|---|---|---|
| | Current collector | Positive electrode active material | Polymer matrix material | wt % | Conductive material | wt % | Inorganic filler material | wt % | Thickness H of safety coating (μm) |
| CPlate P | Al foil | NCM811 | / | / | / | / | / | / | / |
| Comp. Plate CP | Al foil | NCM811 | uncrosslinked PVDF | 90 | SP | 10 | / | / | 20 |
| Plate 1 | Al foil | NCM811 | uncrosslinked PVDC | 35 | SP | 10 | alumina | 55 | 10 |
| Plate 2 | Al foil | NCM811 | uncrosslinked PVDF | 35 | SP | 10 | LFP | 55 | 3 |

TABLE 1-2

Performance of lithium ion battery

| Battery No. | Positive electrode | Negative electrode | Puncture Test |
|---|---|---|---|
| Battery 1 | CPlate P | CPlate N | 10 fail |
| Battery 2 | Comp. Plate CP | CPlate N | 2 pass, 8 fail |
| Battery 3 | Plate 1 | CPlate N | 10 pass |
| Battery 4 | Plate 2 | CPlate N | 10 pass |

TABLE 1-3

Performance of lithium ion battery

| Battery No. | Positive electrode | Negative electrode | DC resistance growth rate@130° C., 1 h | DC resistance growth rate@130° C., 2 h |
|---|---|---|---|---|
| Battery 2 | Comp. Plate CP | CPlate N | 20% | 30% |
| Battery 4 | Plate 2 | CPlate N | 1200% | 1500% |

The data in Table 1-1 and Table 1-2 indicated that the safety coating with PVDF or PVDC as a polymer matrix significantly improves the safety performance of the battery during nail penetration, especially in the case that an inorganic filler is added. The growth of DCR data in Table 1-3 indicated that the safety coating composed of PVDF and a conductive material does have a PTC effect, and the addition of the inorganic filler significantly improves the DCR growth of the battery at a high temperature, that is, the PTC effect is more remarkable.

4.2 Effect of the Content of Each Component Contained in the Safety Coating

Next, the effect of the content of each component contained in the safety coating will be further studied. Since the technical effects and laws of alumina as inorganic filler and the electrochemically active material (LFP) as inorganic filler were substantially the same in the "Puncture test", in order to simplify the experiments, alumina was used as an inorganic filler to illustrate the effect of each component on the safety coating.

In order to further study the effect of the content of each component contained in the safety coating, the corresponding safety coating, positive electrode plate, negative electrode plate and battery were prepared with the specific materials and amounts listed in Table 2-1 below according to the methods and procedures described in "1. Preparation method", and then were tested according to the method specified in "3. Tests for battery performance". In order to ensure the accuracy of data, 4 samples were prepared for each battery (10 samples for the puncture test or overcharge test) and tested independently. The final test results were averaged and shown in Table 2-2.

TABLE 2-1

Compositions of electrode plate

| | | | Composition of the safety coating | | | | | | |
|---|---|---|---|---|---|---|---|---|---|
| | Current collector | Positive electrode active material | Polymer matrix material | wt % | Conductive material | wt % | Inorganic filler material | wt % | Thickness of safety coating H (μm) |
| Comp. Plate 2-1 | Al foil | NCM811 | uncrosslinked PVDF | 75 | SP | 20 | alumina | 5 | 8 |
| Plate 2-2 | Al foil | NCM811 | uncrosslinked PVDF | 75 | SP | 15 | alumina | 10 | 8 |
| Plate 2-3 | Al foil | NCM811 | uncrosslinked PVDF | 75 | SP | 10 | alumina | 15 | 8 |
| Plate 2-4 | Al foil | NCM811 | uncrosslinked PVDF | 60 | SP | 10 | alumina | 30 | 8 |
| Plate 2-5 | Al foil | NCM811 | uncrosslinked PVDF | 60 | SP | 8 | alumina | 32 | 8 |
| Plate 2-6 | Al foil | NCM811 | uncrosslinked PVDF | 55 | SP | 15 | alumina | 30 | 8 |
| Plate 2-7 | Al foil | NCM811 | uncrosslinked PVDF | 50 | SP | 25 | alumina | 25 | 8 |
| Plate 2-8 | Al foil | NCM811 | uncrosslinked PVDF | 40 | SP | 15 | alumina | 45 | 8 |
| Plate 2-9 | Al foil | NCM811 | uncrosslinked PVDF | 35 | SP | 5 | alumina | 60 | 8 |
| Comp. Plate 2-10 | Al foil | NCM811 | uncrosslinked PVDF | 25 | SP | 5 | alumina | 70 | 8 |

TABLE 2-2

Performance of lithium ion batteries

| Battery | Positive electrode | Negative electrode | Puncture Test | Cycle Life (cycle) |
|---|---|---|---|---|
| Battery6 | Comp. Plate 2-1 | CPlate N | 5 fail, 5 pass | 2502 |
| Battery7 | Plate 2-2 | CPlate N | 10 pass | 2351 |
| Battery8 | Plate 2-3 | CPlate N | 10 pass | 2205 |
| Battery9 | Plate 2-4 | CPlate N | 10 pass | 2251 |
| Battery10 | Plate 2-5 | CPlate N | 10 pass | 2000 |
| Battery11 | Plate 2-6 | CPlate N | 10 pass | 2408 |
| Battery12 | Plate 2-7 | CPlate N | 10 pass | 2707 |
| Battery13 | Plate 2-8 | CPlate N | 10 pass | 2355 |
| Battery14 | Plate 2-9 | CPlate N | 10 pass | 1800 |
| Battery15 | Comp. Plate 2-10 | CPlate N | 4 fail, 6 pass | 1715 |

The data in Table 2-1 and Table 2-2 show that: (1) If the content of the inorganic filler is too low, the stability of the safety coating is not high, so safety performance of the battery cannot be fully improved; if the content of the inorganic filler is too high, the content of the polymer matrix is too low, so that the safety coating cannot exert its effect; (2) the conductive material has a great influence on the internal resistance and polarization of the battery, so it would affect the cycle life of the battery. The higher the content of the conductive material, the smaller the internal resistance and polarization of the battery is so that the cycle life will be better.

It had been found through experiments that the appropriate content range of each component in the safety coating is as follows:

the content of the polymer matrix is 35 wt % to 75 wt %;
the content of the conductive material is 5 wt % to 25 wt %; and
the content of the inorganic filler is from 10 wt % to 60 wt %.

As long as the content of each component in the safety coating is within the above range, the effect of improving the safety and electrical performance (e.g., cycle performance) of the battery can be achieved.

4.3 Effect of the Kind of the Inorganic Filler on Battery Performance

In order to further study the effect of materials in the safety coating on performances of the electrode plate and the battery, the corresponding safety coating, positive electrode plate, negative electrode plate and battery were prepared with the specific materials and amounts listed in Table 3-1 below according to the methods and procedures described in "1. Preparation method", and were tested according to the method specified in "3. Tests for battery performance". In order to ensure accuracy of data, 4 samples were prepared for each battery (10 samples for the puncture test or overcharge test) and tested independently. The final test results were averaged which were shown in Table 3-2.

TABLE 3-1

Compositions of electrode plate

| | | Positive electrode active material | Composition of safety coating | | | | Inorganic filler | | Thickness H of safety coating (μm) |
| | Current collector | | Polymer matrix | | Conductive material | | | Carbon content | |
| | | | Material | wt % | Material | wt % | Material | wt % | (wt %) | |
|---|---|---|---|---|---|---|---|---|---|---|
| Plate 2-41 | Al foil | NCM811 | uncrosslinked PVDF | 60 | SP | 10 | alumina | 30 | / | 8 |
| Plate 2-42 | Al foil | NCM811 | uncrosslinked PVDF | 60 | SP | 10 | LFP | 30 | / | 8 |
| Plate 2-43 | Al foil | NCM811 | uncrosslinked PVDF | 60 | SP | 10 | LFP/C | 30 | 1 | 8 |
| Plate 2-44 | Al foil | NCM811 | uncrosslinked PVDF | 60 | SP | 10 | LFP/C | 30 | 2 | 8 |
| Plate 2-45 | Al foil | NCM811 | uncrosslinked PVDF | 60 | SP | 10 | LFP/C | 30 | 3 | 8 |
| Plate 2-46 | Al foil | NCM811 | uncrosslinked PVDF | 60 | SP | 10 | Li4Ti5O12/C | 30 | 5 | 8 |

TABLE 3-2

Performances of lithium ion batteries

| Battery | Positive electrode | Negative electrode | Puncture Test | Overcharge Test | Cycle test (cycle) |
|---|---|---|---|---|---|
| Battery 46 | Plate2-41 | CPlate N | 10 pass | No pass | 2200 |
| Battery 47 | Plate2-42 | CPlate N | 10 pass | 10 pass | 2300 |
| Battery 48 | Plate2-43 | CPlate N | 10 pass | 10 pass | 2500 |
| Battery 49 | Plate2-44 | CPlate N | 10 pass | 10 pass | 2700 |
| Battery 50 | Plate2-45 | CPlate N | 10 pass | 10 pass | 2900 |
| Battery 51 | Plate2-46 | CPlate N | 10 pass | 10 pass | 3000 |

The data in Tables 3-1 and 3-2 show that compared to other materials (such as alumina), the electrochemically active material further significantly improves the overcharge safety performance of the battery. In addition, carbon coating modified electrochemically active material also further improves the cycle life of the battery.

4.4 Effect of Crosslinking on Battery Performance

The corresponding safety coating, positive electrode plate, negative electrode plate and battery were prepared with the specific materials and amounts listed in Table 4-1 below according to the methods and procedures described above, and were tested according to the specified method to study the effect of the crosslinking on coating cracking and DCR.

TABLE 4-1

Effect of crosslinking agent

| | | | Composition of the safety coating | | | | | | | | |
|---|---|---|---|---|---|---|---|---|---|---|---|
| | | positive electrode active material | polymer matrix material | | The first conductive material | | The first positive electrode active material | | Crosslinking agent | | Thickness of the underlying layer H (μm) | Cracking (coating speed 50 m/min) |
| | Current collector | | | wt % | material | wt % | material | wt % | type | Ratio to the polymer material | | |
| Plate 2-51 | Al foil | NCM811 | uncrosslinked PVDF | 60 | SP | 10 | LFP/C | 30 | No | 0 | 8 | Severe cracking |
| Plate 2-52 | Al foil | NCM811 | crosslinked PVDF | 60 | SP | 10 | LFP/C | 30 | acrylonitrile | 0.01% | 8 | Mild cracking |
| Plate 2-53 | Al foil | NCM811 | crosslinked PVDF | 60 | SP | 10 | LFP/C | 30 | tetra-isocyanate | 0.1% | 8 | No cracking |
| Plate 2-54 | Al foil | NCM811 | crosslinked PVDF | 60 | SP | 10 | LFP/C | 30 | polyethylene glycol | 0.5% | 8 | No cracking |
| Plate 2-55 | Al foil | NCM811 | crosslinked PVDF | 60 | SP | 10 | LFP/C | 30 | acrylonitrile | 1.5% | 8 | No cracking |
| Plate 2-56 | Al foil | NCM811 | crosslinked PVDF | 60 | SP | 10 | LFP/C | 30 | acrylonitrile | 5% | 8 | No cracking |
| Plate 2-57 | Al foil | NCM811 | uncrosslinked PVDC | 60 | SP | 10 | LFP/C | 30 | No | No | 8 | Severe cracking |
| Plate 2-58 | Al foil | NCM811 | crosslinked PVDC | 60 | SP | 10 | LFP/C | 30 | acrylonitrile | 3% | 8 | No cracking |

In the case where the coating speed of the positive electrode active material layer was 50 m/min, the polymer matrix of the electrode plate 2-51 was not crosslinked by adding a crosslinking agent, and thus there was a severe cracking on the electrode plate. The addition of a crosslinking agent had a significant effect on improving the cracking of the electrode plate. No cracking occurred in the electrode plate 2-53 to the electrode plate 2-56. Similar experiments were performed for PVDC (electrode plates 2-57 and 2-58) and the results were similar. It can be seen that the addition of the crosslinking agent significantly eliminates the coating cracking of the electrode plate.

TABLE 4-2

Performance of lithium ion battery

| Battery | Positive electrode | Negative electrode | DCR of the battery | Puncture Test |
|---|---|---|---|---|
| Battery 52 | Plate 2-51 | CPlate N | 100% | 10 pass |
| Battery 53 | Plate 2-52 | CPlate N | 80% | 10 pass |
| Battery 54 | Plate 2-53 | CPlate N | 85% | 10 pass |
| Battery 55 | Plate 2-54 | CPlate N | 78% | 10 pass |
| Battery 56 | Plate 2-55 | CPlate N | 75% | 10 pass |
| Battery 57 | Plate 2-56 | CPlate N | 84% | 10 pass |

For the electrode plate 2-51, the polymer matrix was not crosslinked by adding a crosslinking agent, and thus the polymer matrix was swelled greatly in the electrolyte, resulting in a large DCR. The addition of the crosslinking agent can reduce the swelling of the polymer matrix in the electrolyte, and had a significant effect on reducing DCR. It can be seen that the addition of the crosslinking agent can significantly reduce the DCR of the battery.

In addition, the above data indicated that PVDF/PVDC can be used as the polymer matrix of PTC layer regardless of crosslinking, and the obtained battery had high safety performance in which the test result of puncture test is excellent, which indicated that the crosslinking treatment did not adversely affect the protective effect of the safety coating. Furthermore, compared with the uncrosslinked PVDC/PVDF, the crosslinking treatment improved the cracking of the electrode plate, from severe cracking to no cracking or mild cracking. The crosslinking treatment reduces the swelling of the polymer matrix in the electrolyte, thereby reducing the DCR by 15% to 25%, thereby improving the electrical properties of the battery.

4.5 Effect of Electrolyte Viscosity on Battery Performance

In order to further study the effect of electrolyte viscosity on the performance of battery, the corresponding positive electrode plates, negative electrode plates and batteries were prepared with the specific materials and amounts listed in Tables 5-1 and 5-2 below the particular materials and amounts listed in Table 0-1 below (however, the electrolytes having different viscosities were obtained by varying the ratio of the several solvents in the electrolyte preparation and the concentration of the electrolyte) according to the methods and procedures described in "1. Preparation method", and were tested according to the method specified in "3. Tests for battery performance".

In order to ensure accuracy of data, 4 samples were prepared for each battery (10 samples for the puncture test) and tested independently. The final test results were averaged and shown in Table 5-3.

TABLE 5-1

Composition of electrolyte

| | Composition of electrolyte (weight ratio) | Viscosity of electrolyte (cp) |
|---|---|---|
| Common electrolyte | EC:EMC:DEC = 30:50:20, 1M/L LiPF6 | 3.5 |
| Electrolyte 1 | EC:EMC:DMC = 25:25:50, 1.1M/L LiPF6 | 2 |
| Electrolyte 2 | EC:EMC:DEC = 35:30:35, 1.1M/L LiPF6 | 4 |
| Comparative electrolyte | EC:EMC:DEC = 35:30:35, 1.4M/L LiPF6 | 5 |

TABLE 5-2

| | | Composition of positive electrode plate | | | | | | |
|---|---|---|---|---|---|---|---|---|
| | | | Composition of the safety coating | | | | | |
| | Current collector | Positive electrode active material | Polymer matrix material | wt % | Conductive material material | wt % | Inorganic filler material | wt % | Thickness H of the safety coating (μm) |
| Plate 2-50 | Al foil | NCM811 | uncrosslinked PVDF | 35 | SP | 10 | LFP | 55 | 6 |

TABLE 5-3

| | Performance of lithium ion battery | | | | |
|---|---|---|---|---|---|
| Battery No. | Positive electrode | Negative electrode | Electrolyte | DCR | Cycle Life |
| Battery 61 | Plate 2-50 | CPlate N | Common electrolyte | 105% | 2000 |
| Battery 63 | Plate 2-50 | CPlate N | Electrolyte 1 | 83% | 3000 |
| Battery 64 | Plate 2-50 | CPlate N | Electrolyte 2 | 116% | 1600 |
| Battery 66 | Plate 2-50 | CPlate N | Comparative electrolyte 3 | 158% | 800 |

The data in Table 5-1, Table 5-2 and Table 5-3 show that lowering the viscosity of electrolyte is advantageous in reducing the DCR of battery, and greatly improved the cycle performance. When the viscosity of electrolyte is ≤4 cp, the DCR increase is ≤16%, and the cycle performance is ≥1600, which meets the design requirements. However, when the viscosity of electrolyte is greater than 4 cp, such as in the battery 65, the DCR is increased by 58%, and the cycle performance is only 800, which cannot meet the design requirements.

The above data indicates that the positive electrode plate of the electrochemical device in the present application greatly improves the nail penetration safety performance of the battery, and the addition of inorganic filler significantly improves the DC resistance growth rate of battery at a high temperature, thereby improving the pass rate in nail penetration safety test of battery.

It will be understood by those skilled in the art that the above implementation examples of this application are only exemplified to be used for a lithium battery, but this application can also be applied to other types of batteries or electrochemical devices, and still may produce good technical effects of this application.

It will be apparent to those skilled in the art that the present application may be modified and varied in accordance with the above teachings. Accordingly, the present application is not limited to the specific embodiments disclosed and described above, and modifications and variations of the present application are intended to be included within the scope of the claims of the present application. In addition, although some specific terminology is used in this specification, these terms are for convenience of illustration only and are not intended to limit the present application in any way.

What is claimed is:

1. An electrochemical device, comprising a positive electrode plate, a negative electrode plate and an electrolyte, wherein the positive electrode plate comprises a current collector, a positive electrode active material layer and a safety coating disposed between the current collector and the positive electrode active material layer; the safety coating comprises a polymer matrix, a conductive material and an inorganic filler;
wherein:
based on the total weight of the polymer matrix, the conductive material and the inorganic filler,
a content of the polymer matrix is from 35 wt % to 75 wt %,
a content of the conductive material is from 5 wt % to 25 wt %,
and a content of the inorganic filler is from 10 wt % to 60 wt %;
the polymer matrix in the safety coating is a polymer matrix having a crosslinked structure;
the inorganic filler is an electrochemically active material or a conductive carbon coating modified electrochemically active material, a conductive metal coating modified electrochemically active material or a conductive polymer coating modified electrochemically active material; and
the electrolyte has a viscosity of ≤4 cp at 25±0.1° C.

2. The electrochemical device according to claim 1, wherein the polymer matrix in the safety coating is fluorinated polyolefin and/or chlorinated polyolefin.

3. The electrochemical device according to claim 2, wherein the fluorinated polyolefin and/or chlorinated polyolefin is selected from at least one of polyvinylidene fluoride (PVDF), carboxylic acid modified PVDF, acrylic acid modified PVDF, polyvinylidene chloride (PVDC), carboxylic acid modified PVDC, acrylic acid modified PVDC, PVDF copolymer, and PVDC copolymer.

4. The electrochemical device according to claim 1, wherein the conductive material is selected from at least one of a conductive carbon-based material, a conductive metal material, and a conductive polymer material.

5. The electrochemical device according to claim 4, wherein the conductive carbon-based material is selected from at least one of conductive carbon black, acetylene black, graphite, graphene, carbon nanotubes, and carbon nanofibers;
the conductive metal material is selected from at least one of Al powder, Ni powder, and gold powder; and
the conductive polymer material is selected from at least one of conductive polythiophene, conductive polypyrrole, and conductive polyaniline.

6. The electrochemical device according to claim 1, wherein the inorganic filler in the safety coating is selected from at least one of lithium cobalt oxide, lithium nickel manganese cobalt oxide, lithium nickel manganese aluminate, lithium iron phosphate, lithium vanadium phosphate, lithium cobalt phosphate, lithium manganese phosphate, lithium manganese iron phosphate, lithium iron silicate, lithium vanadium silicate, lithium cobalt silicate, lithium manganese silicate, spinel lithium manganese oxide, spinel lithium nickel manganese oxide, lithium titanate, or their conductive carbon coating modified materials, their conductive metal coating modified materials, or their conductive polymer coating modified materials.

7. The electrochemical device according to claim 6, wherein the inorganic filler has an average particle size D of 100 nm≤D≤10 μm; and the inorganic filler has a specific surface area (BET) of not more than 500 m²/g.

8. The electrochemical device according to claim 1, wherein the polymer matrix in the safety coating is fluorinated polyolefin and/or chlorinated polyolefin having a crosslinked structure.

9. The electrochemical device according to claim 1, wherein a weight ratio of the polymer matrix to the conductive material is 2 or more.

10. The electrochemical device according to claim 1, wherein a weight ratio of the polymer matrix to the conductive material is 3 or more and 8 or less.

11. The electrochemical device according to claim 1, wherein the positive electrode active material layer comprises a carbon nanotube conductive agent; based on the total weight of the entire positive electrode active material layer, a content of the carbon nanotube is from 0.4 wt % to 1.0 wt %.

12. The electrochemical device according to claim 1, wherein the current collector is a metal current collector.

13. The electrochemical device according to claim 12, wherein the current collector is a porous current collector.

14. The electrochemical device according to claim 1, wherein a thickness H of the safety coating is 1 μm≤H≤20 μm.

15. The electrochemical device according to claim 14, wherein a thickness H of the safety coating is 3 μm≤H≤10 μm; and a bonding force between the safety coating and the current collector is greater than or equals to 10 N/m.

16. The electrochemical device according to claim 1, wherein in the safety coating, based on the total weight of the polymer matrix, the conductive material and the inorganic filler, the content of the polymer matrix is from 50 wt % to 75 wt %, the content of the conductive material is from 5 wt % to 20 wt %, and the content of the inorganic filler is from 15 wt % to 45 wt %.

17. The electrochemical device according to claim 1, wherein the electrochemical device is a capacitor, a primary battery or a secondary battery.

18. A battery module, comprising the electrochemical device according to claim 17, wherein the electrochemical device is a primary battery or a secondary battery.

19. A battery pack, comprising the battery module according to claim 18.

20. A device, comprising the electrochemical device according to claim 17 as a power source, wherein the electrochemical device is a primary battery or a secondary battery.

* * * * *